United States Patent
Scarinci

(10) Patent No.: US 8,490,405 B2
(45) Date of Patent: Jul. 23, 2013

(54) GAS TURBINE ENGINE MIXING DUCT AND METHOD TO START THE ENGINE

(75) Inventor: Tomas Scarinci, Mont-Royal (CA)

(73) Assignee: Rolls-Royce Canada, Ltd., Montreal (CA)

( * ) Notice: Subject to any disclaimer, the term of this patent is extended or adjusted under 35 U.S.C. 154(b) by 763 days.

(21) Appl. No.: 12/283,764

(22) Filed: Sep. 16, 2008

(65) Prior Publication Data

US 2009/0013696 A1  Jan. 15, 2009

Related U.S. Application Data

(62) Division of application No. 11/255,339, filed on Oct. 21, 2005.

(51) Int. Cl.
*F02C 7/266* (2006.01)

(52) U.S. Cl.
USPC .................................. 60/778; 431/8

(58) Field of Classification Search
USPC ...... 60/778, 786, 737, 39.821, 39.827; 431/8, 431/9, 191, 192, 354
See application file for complete search history.

(56) References Cited

U.S. PATENT DOCUMENTS

| | | | |
|---|---|---|---|
| 2,923,348 A * | 2/1960 | Fraser | 431/158 |
| 4,701,124 A | 10/1987 | Maghon et al. | |
| 4,782,770 A * | 11/1988 | Carlson | 110/264 |
| 5,067,419 A * | 11/1991 | Kobayashi et al. | 110/234 |
| 5,165,241 A | 11/1992 | Joshi et al. | |
| 5,235,814 A | 8/1993 | Leonard | |
| 5,413,478 A | 5/1995 | Lang | |
| 5,417,070 A | 5/1995 | Richardson | |
| 5,476,378 A * | 12/1995 | Zagoroff et al. | 432/222 |
| 5,638,682 A | 6/1997 | Joshi et al. | |
| 5,680,766 A | 10/1997 | Joshi et al. | |
| 5,685,139 A | 11/1997 | Mick et al. | |
| 6,141,967 A | 11/2000 | Angel et al. | |
| 6,179,608 B1 | 1/2001 | Kraemer et al. | |
| 6,253,555 B1 | 7/2001 | Willis | |
| 6,286,300 B1 | 9/2001 | Zelina et al. | |
| 6,301,899 B1 | 10/2001 | Dean et al. | |
| 6,311,496 B1 | 11/2001 | Alkabie | |
| 6,360,776 B1 | 3/2002 | McCormick et al. | |
| 6,698,206 B2 | 3/2004 | Scarinci et al. | |
| 6,886,325 B2 | 5/2005 | Norris et al. | |
| 6,912,857 B2 * | 7/2005 | Schmotolocha et al. | 60/776 |
| 2002/0026796 A1 | 3/2002 | Gutmark et al. | |
| 2002/0069645 A1 | 6/2002 | Mowill | |

(Continued)

FOREIGN PATENT DOCUMENTS

WO  WO 2005/010428 A1  2/2005
WO  WO 2006/053866 A1  5/2006

OTHER PUBLICATIONS

Kroner and Sattelmeyer, Flashback Limits for Combustion Induced Vortex Breakdown in a Swirl Burner, GT-2002-30075, ASME Turbo Expo 2002, Jun. 3-6, 2002 Amsterdam, Netherlands.

(Continued)

*Primary Examiner* — Andrew Nguyen
(74) *Attorney, Agent, or Firm* — Kreig DeVault LLP

(57) ABSTRACT

A combustion chamber device having a field static pressure gradient adapted to expel a flame kernel or hot spot from a fuel-air mixing duct. The swirling flow passing through an annular mixing duct is turned from a radial direction to an axial direction before entering the combustion chamber. An ignition source located within the fuel-air mixing duct can then be used to start the combustion process in the gas turbine.

9 Claims, 2 Drawing Sheets

U.S. PATENT DOCUMENTS

| | | |
|---|---|---|
| 2002/0174656 A1 | 11/2002 | Hein |
| 2003/0010032 A1 | 1/2003 | Stuttaford et al. |
| 2004/0050057 A1 | 3/2004 | Bland et al. |

OTHER PUBLICATIONS

Fritz, Kroner and Sattelmeyer, Flashback in a Swirl Burner with Cylindrical Premixing Zone, ASME 2001-GT-0054 (2001).

Davis and Black, Dry-Low-NOx Combustion Systems for GE Heavy-Duty Gas Turbines, GE report GER-3568G (2000).

Supplementary European Search Report, EP 06 85 0527, Jul. 20, 2010, Rolls-Royce Canada Limited.

International Search Report and Written Opinion, PCT/US06/41108, Dec. 9, 2008, Rolls-Royce Canada, Ltd.

\* cited by examiner

GAS TURBINE ENGINE MIXING DUCT AND METHOD TO START THE ENGINE

CROSS REFERENCE

The present application is a divisional of U.S. patent application Ser. No. 11/255,339 filed Oct. 21, 2005, which is incorporated herein by reference.

FIELD OF THE INVENTION

The present invention relates generally to gas turbine engine combustion systems. More particularly, in one form the present invention relates to a mixing duct for the passage of a swirled fuel and air mixture to a burning zone of a combustor.

BACKGROUND

A gas turbine engine is typical of turbo-machinery in which the present application may be utilized. It is well known that a gas turbine engine conventionally comprises a compressor for compressing inlet air to an increased pressure for combustion in a combustion chamber. A mixture of fuel and the increased pressure air is burned in the combustion chamber to generate a high temperature gaseous flow stream for causing rotation of turbine blades within the turbine. The turbine blades convert the energy from the high temperature gaseous flow stream into kinetic energy, that may be utilized for example to turn an electric generator, pump or other mechanically driven device. Further, the high temperature gaseous flow stream may be used as a heat source to produce steam or provide energy for chemical processing.

Many countries have enacted laws limiting the amount of pollutant emissions, such as nitrogen oxide ($NO_x$) emissions. Several approaches exist for lowering $NO_x$ emissions, but one generally accepted practice is to reduce the kinetic formation of $NO_x$ by lowering the temperature at which the fuel and air react in the combustor. Some low emissions combustion systems utilize a lean premix approach where the reaction temperature is reduced by mixing the fuel and air prior to allowing combustion reactions to proceed. A drawback to many lean premix combustion systems has been the risk of flashback of the flame into the premixing section.

Thus a need remains for further contribution in the area of premixing technology. The present application satisfies this and other needs in a novel and nonobvious way.

SUMMARY

One form of the present invention contemplates a method of starting a gas turbine engine, comprising: imparting swirl to a fluid including air; introducing a fuel into the fluid to form a fuel and air mixture; flowing the fuel and air mixture through an annular duct disposed in fluid flow communication with a combustion chamber of the gas turbine engine; igniting a portion of the fuel and air mixture within the annular duct to form a hot spot; and, subjecting the hot spot to a pressure gradient within the annular duct to expel the hot spot from the annular duct and into the combustion chamber.

Another form of the present invention contemplates an apparatus comprising: a mechanical housing; a centerbody located within the mechanical housing; a combustion chamber; a plurality of radial inflow swirler vanes located within the mechanical housing and adapted to swirl a fluid passing therethrough; and an annular fluid flow passageway located within the mechanical housing and around at least a portion of the centerbody, the annular fluid flow passageway being in flow communication with the plurality of radial inflow swirler vanes and having an outlet in flow communication with the combustion chamber, the annular fluid flow passageway having a substantially constant height and a decreasing pressure gradient with the lowest pressure at the outlet.

Yet another form of the present invention contemplates an apparatus comprising: a housing; a centerbody located within the housing; a combustion chamber; an annular fluid flow passage located within the housing and around at least a portion of the centerbody, the annular fluid flow passageway having an outlet in flow communication with the combustion chamber; a plurality of radial vanes located within the housing and adapted to impart swirl to a working fluid flow passing through the annular fluid flow passage; and, wherein the annular fluid flow passage between the plurality of radial vanes and the outlet being a curvilinear passage configured to turn the working fluid flow from a radial inwards direction to an axial direction and the force due to the swirling motion of the working fluid flow is equal and opposite to the force due to turning the working fluid flow from a radial direction to an axial direction.

Related objects and advantages of the present invention will be apparent from the following description of the illustrative embodiments.

DESCRIPTION OF THE ILLUSTRATIVE EMBODIMENTS

Figure 1:
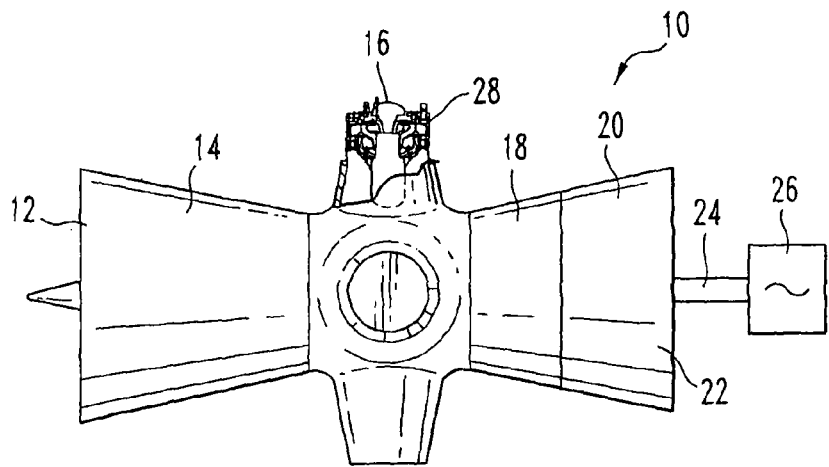
FIG. 1 is a illustrative view of a gas turbine engine having a combustor with one embodiment of a annular mixing duct of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

Referring to FIG. 1, there is illustrated a generic representation of a gas turbine engine 10. In one form the gas turbine engine 10 is an industrial gas turbine engine including in axial flow series an inlet 12, a compressor section 14, a combustor section 16 including a plurality of combustion chamber devices 28, a turbine section 18, a power turbine section 20 and an exhaust 22. The turbine section 20 is arranged to drive the compressor section 14 via one or more shafts (not illustrated). The power turbine section 20 is arranged to provide drive for other purposes. In one non-limiting form the power turbine section 20 is arranged to drive an electric generation device via a shaft 24. The operation of the gas turbine engine 10 is considered generally conventional and will not be discussed further.

Figure 2:
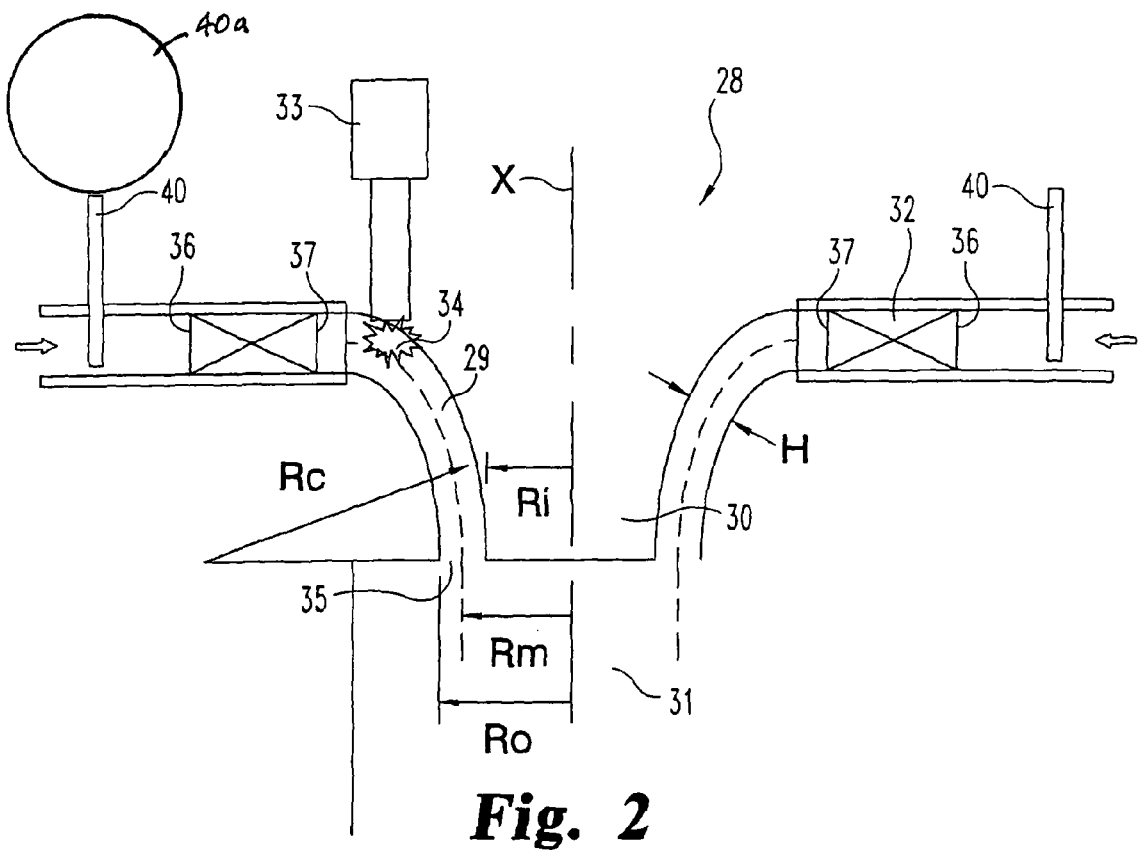
FIG. 2 is an enlarged illustrative sectional view of one embodiment of the combustor comprising a mixing duct of the present invention.
Figure 4:
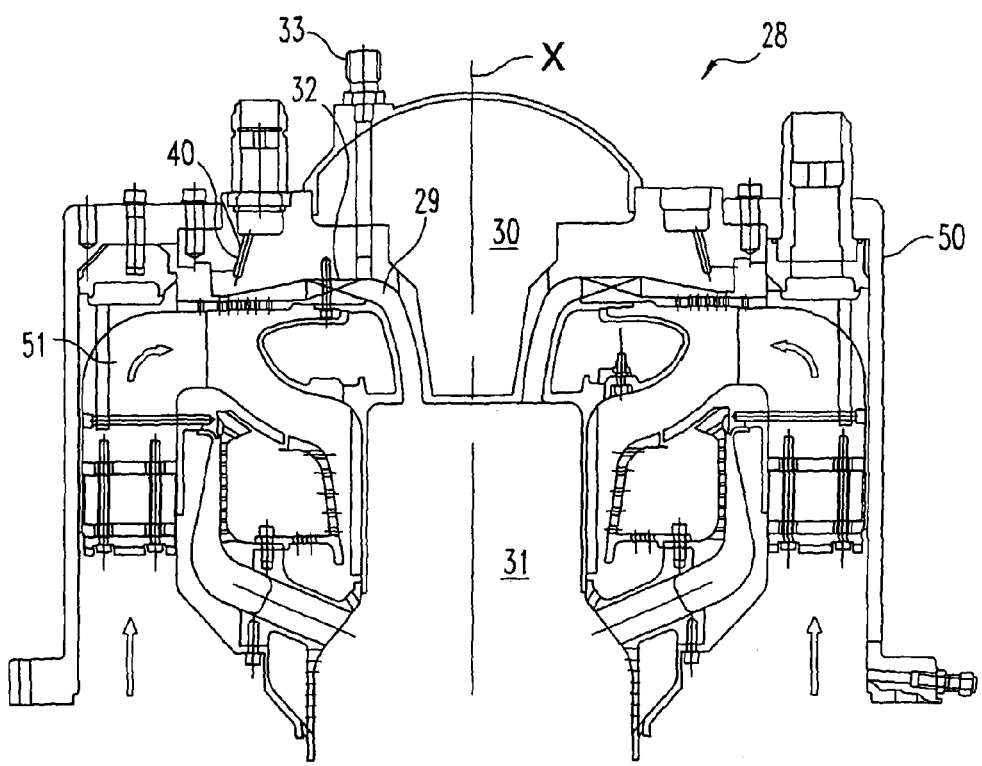
FIG. 4 is an enlarged cross sectional view taken through the combustion chamber device of FIG. 1.

One embodiment of a combustion chamber device 28 of the present application is shown in FIGS. 2 and 4. In one form the gas turbine engine includes a plurality of circumferentially spaced combustion chamber devices 28. The axes of the combustion chamber devices 28 extend in a generally radial direction relative to the centerline of the engine 10. However, other quantities and orientations of the combustion chamber devices are contemplated herein.

Referring to FIG. 2, there is set forth an illustrative view of a portion of one of the combustion chamber devices 28. The combustion chamber device 28 has an axial centerline X. FIG. 2 depicts a relationship between an annular mixing duct 29, a centerbody 30, a combustion chamber 31 and a set of radial vanes 32. Combustion chamber 31 is the location at which the fuel and air mixture are burned to create the hot exhaust flow.

In one form an ignition or spark source 33 is located remote from the combustion chamber 31. The location of the ignition or spark source 33 remote from the combustion chamber 31 means that the device is not exposed to the hot combustion environment and therefore durability is enhanced as thermal stresses are substantially reduced. While in one embodiment the ignition or spark source is located in an upstream portion of the duct 29, the present application contemplates other locations for the ignition or spark source. Further, in another form the ignition or spark source is not located remotely from the combustion chamber and may be located within the combustion chamber. The ignition or spark source 33 is adapted to locate an ignition source 34 within or in operative communication with the mixing duct 29. The ignition or spark source 33 is activated to create a hot spot, within the annular mixing duct 29. The term hot spot is used here to refer to, but not limited to, flame bubbles, flame kernels and/or hot spots. In a preferred embodiment, the hot spot is a flame kernel.

Figure 3:
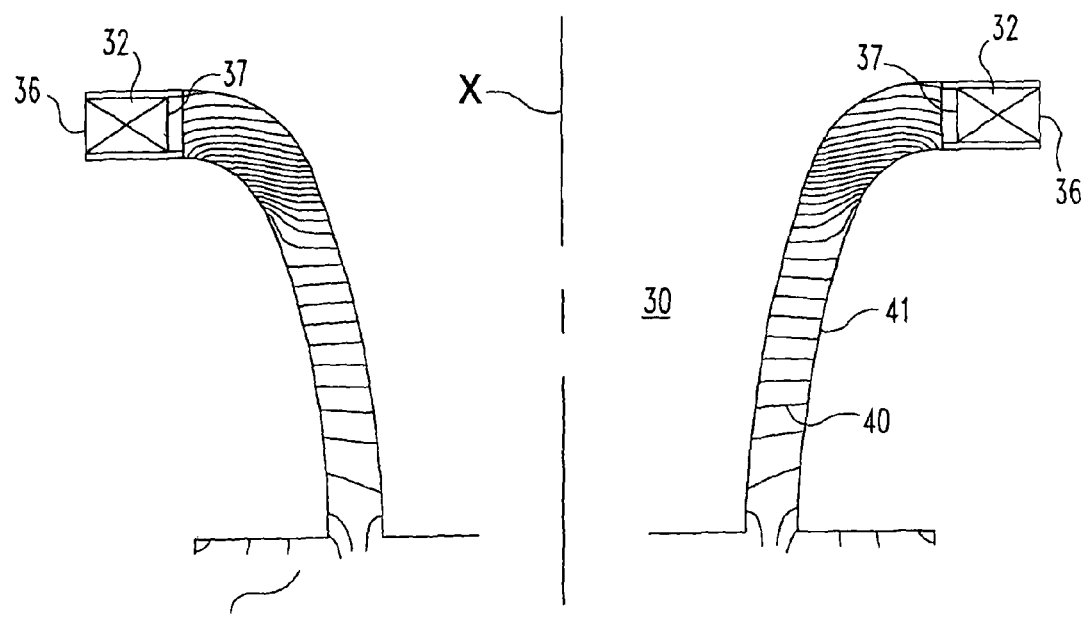
FIG. 3 is a view of one embodiment of the contours of the static pressure in the mixing duct.

With reference to FIGS. 2 and 3 there is described the passage of a fluid stream through the annular mixing duct 29. The annular mixing duct 29 defining a fluid flow passageway configured to have a static pressure gradient that decreases as it proceeds to the exit plane 35 of the duct. Located upstream of the annular mixing duct 29 is the set of radial vanes 32. The set of radial vanes 32 receive the incoming flow of fluid at the radial vanes inlet 36 and discharge a swirling fluid flow at the radial vanes outlet 37. The set of radial vanes 32 includes a plurality of vanes and/or airfoils that turn the incoming fluid to impart swirl to the flow stream. In one form the set of radial vanes 32 defines a radial inflow swirler. However, other styles and types of swirlers are fully contemplated herein.

A fuel delivery device 40, illustrated schematically in FIG. 2, is operated to introduce fuel into the flow of working fluid passing to the set of radial vanes 32. The fuel delivery device 40 is coupled to a fuel source 40a. The present application contemplates an alternate embodiment wherein the introduction of fuel occurs after the working fluid flow passes through the set of radial vanes 32. In yet another embodiment the fuel is being introduced within the set of radial vanes 32 as the working fluid flows therethrough. In another form, the present application contemplates that fuel may be delivered through one or more of the leading edges, trailing edges, both trailing and leading edges and/or other locations along the vanes. The fuel deliver device 40 delivers the fuel into the flow of working fluid at a pressure higher than the environment into which it discharges. The flow of working fluid has been pressurized in the compressor section 14 prior to receiving the introduction of the fuel. In one form the flow of working fluid is air. Further, the fuel injected through the fuel delivery device 40 is typically a gaseous fuel such as natural gas or a synthetic gaseous fuel.

The flow of working fluid and fuel as it exits the set of radial vanes passes within the annular mixing duct 29 along the centerbody 30. In one form the curvature of the annular mixing duct 29 defines a fluid flow path wherein the centrifugal force associated with the swirling motion of the fluid flow is compensated by the curvature of the streamlines being turned from a substantially radial direction to a substantially axial direction. A result is that the centrifugal forces associated with the swirling motion and the streamlines being turned from a radial to an axial direction are equal and opposite at all times. As there is no net force acting to change the direction of any of the streamlines, all streamlines within the mixing duct 29 are therefore straight lines.

With reference to FIG. 3, there is illustrated one non-limiting example of the contours of the static pressure in the annular mixing duct 29 as the fluid passes therethrough. The static pressure gradient is an adverse pressure gradient with the lowest pressure at the exit plane 35. In one form the isobars 40 are generally oriented normal to the walls 41 of the annular mixing duct 29. The configuration allows for the pressure gradient in the annular mixing duct 29 to provide a net expulsive force on any flame bubble, flame kernel or hot spot that might be found to exist within the duct 29. The term hot spot will be utilized to refer to flame bubbles, flame kernels and/or hot spots unless specifically provided to the contrary. The above-mentioned expulsive force is considered to be a buoyancy force acting on any fluid region which might be lighter (less dense) than the average surrounding working fluid within the mixing duct 29. Regions of lower density fluid are therefore accelerated in the direction of the static pressure gradient. The result is that a net force is obtained within the mixing duct 29 that will naturally expel any hot spot from the mixing duct 29. Therefore, the annular mixing duct 29 is safe from the risk of flashback or flame stabilization as any hot spot within it gets blown out to the combustion chamber. In one form, a hot spot, such as the one resulting from an electrical spark source 33, blown out to the combustion chamber, can then be utilized to ignite the fuel and air mixture within the combustion chamber. In a preferred form, the electrical spark source 33 forms a flame kernel.

With reference FIG. 2, there are described further parameters regarding the annular mixing duct 29. In one embodiment the curvature and dimensions of the annular mixing duct 29 will follow the following geometric relationship:

$$R_m/R_c = (\tan \alpha)^2$$

where $R_m$ is the mean square radius at the exit plane 35 and $R_c$ is the radius of curvature of the curved annular passage 29 and $\alpha$ is the angle of the swirling flow. The angle $\alpha$ is defined as the angle between the meridional and tangential components of the swirled fluid flow. The mean square radius $R_m$ is defined as:

$$R_m = ((R_i^2 + R_o^2)/2)^{1/2}$$

where $R_i$ is the inner radius and $R_o$ is the outer radius dimension, respectively, at the exit plane 35 of the annular mixing duct 29. The annular duct 29 having a constant height "H" throughout.

With reference to FIG. 4, there is illustrated a sectional view of one embodiment of the combustion chamber device 28. The combustion chamber device 28 includes a mechanical housing 50. The pressurized air from the compressor section 14 flows through the passageway 51 to the annular mixing duct 29. Fuel is delivered into the working fluid flow by the fuel delivery device 40. The fuel and working fluid pass through the set of radial vanes 32. The swirled working fluid and fuel exit the set of radial vanes 32 and pass to the combustion chamber 31. In one form an ignition device 33 is located in operative relationship with the fuel and working fluid passing through the annular mixing duct 29.

The utilization of an annular mixing duct of the present invention allows for the placement of an ignition source in an upstream portion of the duct. The relatively slower moving fluid stream allows for a reliable ignition process. The pressure gradient expels the hot spot into the combustion chamber 31. Therefore, the expelled hot spot can be utilized to ignite the fuel and air mixture within the combustion chamber. In a preferred form, the expelled hot spot is a flame kernel.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of combusting a fuel and air mixture in a gas turbine engine, the method comprising:
   radially inflowing a gas that includes air toward a central axis of a combustion device disposed in the gas turbine engine;
   swirling the gas using a swirler structure;
   introducing a fuel into the gas to form a fuel and air mixture;
   flowing the fuel and air mixture through an annular duct having an end portion disposed in fluid flow communication with a combustion chamber of the gas turbine engine, the combustion chamber located upstream of a turbine of the gas turbine engine;
   igniting a portion of the fuel and air mixture within the annular duct to form a hot spot upstream of the combustion chamber; and
   in a location upstream of the turbine in the gas turbine engine, subjecting the hot spot to a pressure gradient within the annular duct to expel the hot spot through the end portion of the annular duct and into the combustion chamber.

2. The method of claim 1, where the hot spot is defined by a flame kernel.

3. The method of claim 2, where said subjecting prevents flame stabilization or flashback within the annular duct.

4. The method of claim 2, wherein in said swirling the gas passes through a plurality of swirler vanes, and wherein in said flowing the fuel and air mixture moves in straight lines and isobars characterized in the pressure gradient that are perpendicular to the walls of the annular duct.

5. The method of claim 1, wherein the hot spot created within and expelled from the duct ignites the fuel and air mixture within the combustion chamber.

6. The method of claim 1, wherein the annular duct has an upstream portion; and
   wherein said igniting occurs in the upstream portion of the annular duct.

7. The method of claim 1, which further includes passing the fuel and air mixture through the annular duct, said passing turns the fuel and air mixture from a radial direction to an axial direction.

8. The method of claim 1, wherein in said subjecting the pressure gradient is defined by a decreasing static pressure gradient with the lowest pressure at the exit of the annular duct;
   wherein in said swirling the gas passes through a plurality of swirler vanes;
   wherein said igniting occurs in an upstream portion of the annular duct;
   which further includes passing the fuel and air mixture through the annular duct, said passing turns the fuel and air mixture from a radial direction to an axial direction;
   wherein said subjecting prevents flame stabilization and flashback within the annular duct; and
   wherein the hot spot ignites the fuel and air mixture within the combustion chamber.

9. The method of claim 8, wherein the hot spot is defined as a flame kernel.

* * * * *

UNITED STATES PATENT AND TRADEMARK OFFICE
CERTIFICATE OF CORRECTION

PATENT NO. : 8,490,405 B2  
APPLICATION NO. : 12/283764  
DATED : July 23, 2013  
INVENTOR(S) : Scarinci Page 1 of 1

It is certified that error appears in the above-identified patent and that said Letters Patent is hereby corrected as shown below:

On the Title page, please change Item (75) Inventor: Tomas Scarinci, Mont-Royal (CA)

to

Item (75) Inventor: Thomas Scarinci, Mont-Royal (CA)

Signed and Sealed this  
Twenty-first Day of April, 2015

Michelle K. Lee  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,490,405 B2 | Page 1 of 1 |
| APPLICATION NO. | : 12/283764 | |
| DATED | : July 23, 2013 | |
| INVENTOR(S) | : Scarinci | |

It is certified that error appears in the above-identified patent and that said Letters Patent is hereby corrected as shown below:

Title Page,

Item (75), Inventors, "Thomas" (as corrected to read in the Certificate of Correction issued April 21, 2015) is deleted and patent is returned to its original state with inventor first name in patent to read -- Tomas --.

Signed and Sealed this
Seventh Day of July, 2015

Michelle K. Lee
*Director of the United States Patent and Trademark Office*